United States Patent
Rao (10) Patent No.: US 10,834,523 B1
(45) Date of Patent: Nov. 10, 2020

(54) IDENTIFICATION OF DELIVERY ZONES FOR AUTONOMOUS VEHICLES, ROVERS, AND DRONES

(71) Applicant: Sanjay K. Rao, Palo Alto, CA (US)

(72) Inventor: Sanjay K. Rao, Palo Alto, CA (US)

(73) Assignee: Accelerate Labs, LLC, Palo Alto, CA (US)

(*) Notice: Subject to any disclaimer, the term of this patent is extended or adjusted under 35 U.S.C. 154(b) by 0 days.

(21) Appl. No.: 16/247,565

(22) Filed: Jan. 14, 2019

(51) Int. Cl.
| | |
|---|---|
| *H04W 4/021* | (2018.01) |
| *B64C 39/02* | (2006.01) |
| *G06Q 10/08* | (2012.01) |
| *G01S 17/89* | (2020.01) |
| *G01S 17/933* | (2020.01) |
| *G01S 17/66* | (2006.01) |
| *G01S 19/42* | (2010.01) |

(52) U.S. Cl.
CPC ........... *H04W 4/021* (2013.01); *B64C 39/024* (2013.01); *G01S 17/89* (2013.01); *G06Q 10/083* (2013.01); *G01S 17/66* (2013.01); *G01S 17/933* (2013.01); *G01S 19/42* (2013.01); *G06Q 10/0833* (2013.01)

(58) Field of Classification Search
CPC ..... B64C 39/024; G01S 17/89; G01S 17/023; G01S 17/66; G01S 17/933; G01S 17/026; G01S 19/42; G06Q 10/083; G06Q 10/0833; H04W 4/021
See application file for complete search history.

(56) References Cited

U.S. PATENT DOCUMENTS

| | | | |
|---|---|---|---|
| 9,536,216 B1* | 1/2017 | Lisso | G06Q 10/0832 |
| 10,245,993 B1* | 4/2019 | Brady | B60P 1/6418 |
| 2014/0316243 A1* | 10/2014 | Niedermeyer | A61B 5/7264 600/408 |
| 2016/0068264 A1* | 3/2016 | Ganesh | G01S 19/42 701/2 |
| 2017/0185849 A1* | 6/2017 | High | B64C 39/024 |
| 2018/0261112 A1* | 9/2018 | O'Brien | G06Q 10/083 |
| 2019/0161190 A1* | 5/2019 | Gil | E05F 15/77 |
| 2019/0258264 A1* | 8/2019 | Bash | G06Q 10/0833 |
| 2019/0369641 A1* | 12/2019 | Gillett | B62D 57/028 |
| 2020/0072624 A1* | 3/2020 | Kuzmanovic | G08G 5/0069 |
| 2020/0130829 A1* | 4/2020 | Gandiga | G05D 1/0061 |

* cited by examiner

*Primary Examiner* — Jaime M Holliday (57) ABSTRACT

An autonomous transport device system is enabled for one or more autonomous vehicles and autonomous surface delivery devices. Specific pickup and drop off zones for package delivery and user transport may be defined. The system leverages an artificial intelligence based learning algorithm to understand various environments. Packages may be dropped off in the geofenced areas. In some instances, packages may be stored in hidden areas that are purposely cached local to a likely delivery area. Some areas may be marked for pickup and drop off. Shippers may cache certain packages proximate to locations based on demand, joint distribution centers, and the presence of multiple transport devices including rovers, drones, UAVs, and autonomous vehicles.

20 Claims, 10 Drawing Sheets

FIG. 1

Pickup and Delivery Zones In People Ridesharing Context

| Transport Device Type | | Destination | Image |
|---|---|---|---|
| Ridesharing Vehicle Human Driven 201 |  | 123 X Street Palo Alto, CA 94301 | Home |
| Autonomous Vehicle 202 Autonomous Rover 203 |  | Destination 123 Market Street San Francisco, CA 94111 | Building |
| Delivery Drone 204 |  | 123 ABC Street New York, NY 10036 | |
| Mobile Device Camera in Vehicle 205 |  | 123 myHome Street Mountain View, CA 94041 Positioned in windshield | |

IDENTIFICATION OF DELIVERY ZONES FOR AUTONOMOUS VEHICLES, ROVERS, AND DRONES

CROSS REFERENCE TO RELATED APPLICATIONS

None.

BACKGROUND

This disclosure pertains to autonomous surface and autonomous aerial based systems for package delivery and/or transportation.

ABBREVIATIONS

Summary

Abbreviations include LZ for landing zone, PDZ for a pickup and/or drop off zone, VTOL for a vertical take off and landing device, and UAV for an unmanned aerial vehicle.

It is an aspect of the present disclosure to enable a plurality of areas of a property to be marked for package delivery. It is an aspect of the present disclosure to enable areas to be configured for various delivery. It is an aspect of the present disclosure to enable a mobile application to annotate a property and define a plurality of landing zones, pick up areas, and for characteristics of these areas to be stored and learned using AI to enable more accurate pickups and drop offs.

It is an aspect of the present disclosure to enable a plurality of staging areas to store packages in a distributed set of holding areas. These holding areas may be positioned to be closer to the ultimate destinations, such that packages may be cached proximate to the delivery destination in advance of a need for a package to be delivered.

In some embodiments of the present disclosure, a storage area or a delivery area of a package may include a subterranean area to allow for efficient package storage.

In some embodiments, an imaging system may be enabled to learn and create associations between images and objects and specific delivery zones and landing areas. These associations may be crowd sourced and/or sourced from a plurality of devices such that the preferred drop off zone is correctly learned over time.

It is an aspect of the present disclosure to enable the learning associated with one or more pick up and drop off zones to be used in a plurality of contexts including package delivery and person drop off and pickup and nearby objects such as trees.

As an example, in a ridesharing context, a user in a ridesharing vehicle may request a stop at a particular address such as their home. The fidelity mapping infrastructure may be incorrect at times in that GPS, GLONASS, and other location based services may identify the drop off zone to be in between houses, at a nearby house, or at another location. A camera embedded into a vehicle or on a smart phone with a view of a house or street may be utilized to capture objects as the vehicle comes to an end of a trip. Upon reaching the end of a trip, the location may be noted including address, GPS access coordinates including a latitude and longitude, and other additional location information may be utilized. These additional information identified may include any nearby WiFi access points that are broadcasting one or more SSIDs. In addition, the location of the vehicle, the signal strength of the SSID, the signal strength of a plurality of SSIDs, and the mean time for a new WiFi broadcast message to reach an SSID may be utilized to determine a drop off zone. Similarly, the same context may apply to a delivery rover or a UAV.

In addition, an artificial intelligence and machine learning system may be enabled to learn pickup and drop off locations based on one or more of wireless signal strength, available networks, GPS, video and image acquisition and recognition, and custom developed point of interest indicators. As an example, a custom POI may include a tree which is on the front lawn of a house. A camera or LIDAR system that is enabled to capture the tree object may use a positive ID on the object to determine that it is proximate to a dropoff or pickup location. The actual PDZ can be calculated as a determined distance away from or relative to the identified object.

In some embodiments, packages may include non-perishable items such as household goods. In some embodiments, a package may include perishable items including hot, cold, or frozen food, groceries, or restaurant takeout orders. In some embodiments, medicines, drugs, blood samples, and lab tests may be transported.

Deliveries may be conducted by various transport devices which may include one or more robots. These robots may further have one or more robotic arms and computer vision interfaces for acquisition and perception of environments.

In some instances, a delivery may be made by a self driving or autonomous delivery rover or robot. The rover may be enabled with a plurality of sensor devices to understand and perceive the environment. The rover may further make use of a computer vision system to understand the environment in which it operates.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to those embodiments. On the contrary, the disclosure is intended to cover alternatives, modifications and equivalents, which may be included within the spirit and scope of the disclosure as defined by the appended claims.

Figure 1:
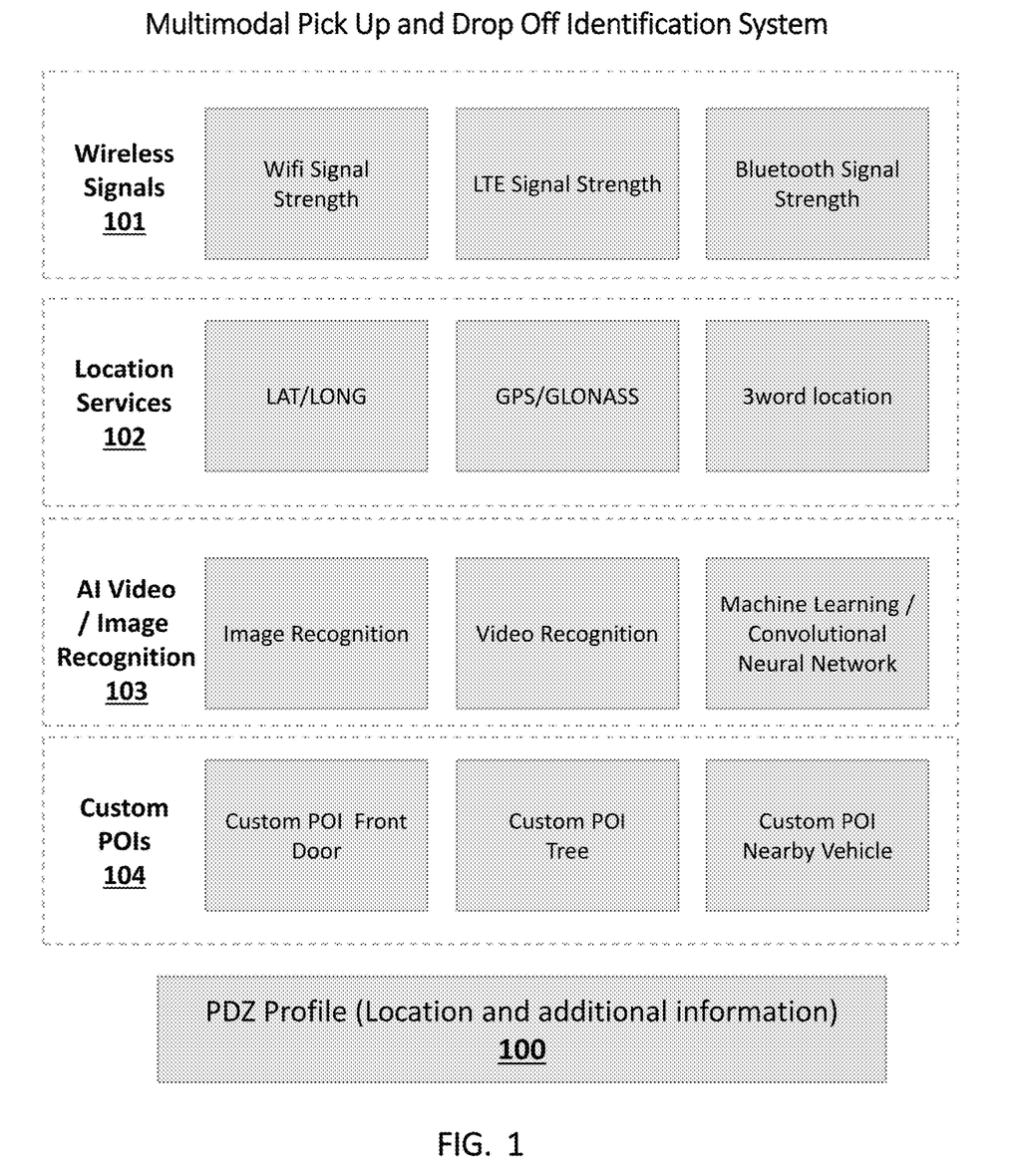
FIG. 1 depicts a plurality of inputs that are enabled to appropriately identify one or more pickup and drop off locations.

Referring now to FIG. 1, FIG. 1 depicts a a plurality of data points that may be used to determine that a transport device such as a vehicle or drone has reached its appropriate destination. In some embodiments, a mobile device may acquire a plurality of signals including SSIDs of WiFi networks, the associated signal strength, one or more public wireless carrier signal strengths such as (LTE, 5G, 4G, 3G, 2G, Bluetooth), and couple this to a pickup or drop off location profile 100. The PDZ profile 100 may be enabled to include a plurality of data sources.

A GPS reading 102 as acquired by a vehicle and/or mobile device may further be enabled to determine whether the transport device has reached a PDZ. The location data may be based on GPS, GLONASS, and/or a three word setting.

Still referring now to FIG. 1, an artificial intelligence system 103 may be used to determine that the transport device such as a vehicle, mobile device, or drone has reached a location. If a PDZ profile does not include any image or video data a transport device may write images and/or LIDAR contour data acquired in proximity to a PDZ. This data may be added to the PDZ profile 100. The PDZ may be stored in a cloud based system accessible to one or more mobile devices, transport devices, and users. Certain mobile applications or other reporting mechanism can be used so as to correctly identify that a pickup or drop off was appropriate. For example, in a ridesharing application, a user may be asked—did we pick you up at the correct location in a user interface. If for example, the answer is yes, than the exact location of the vehicle and one or more factors (images, wireless signals, or custom POIs) may further be added to the PDZ profile 100.

A machine learning or convolutional neural network executed by one or more processors of a server may be used to learn the association between a PDZ and an environment. As an example, a mobile device may capture the environment when a pickup or drop off is made by a transport device and capture a scoring of how correct the vehicles actual position is relative to the PDZ.

Further improvements may be made by users directly or learned over time. As an example, custom points of interest such as trees on a property, an image of the front door, an image of a door handle, an image of a proximate vehicle, may be added to the PDZ profile. The distance of these objects from the vehicle may be estimated using a depth camera and/or an augmented reality system. Users themselves may also improve the PDZ profile 100 directly via a mobile application identifying preferred areas of pickup and drop off.

Figure 2:
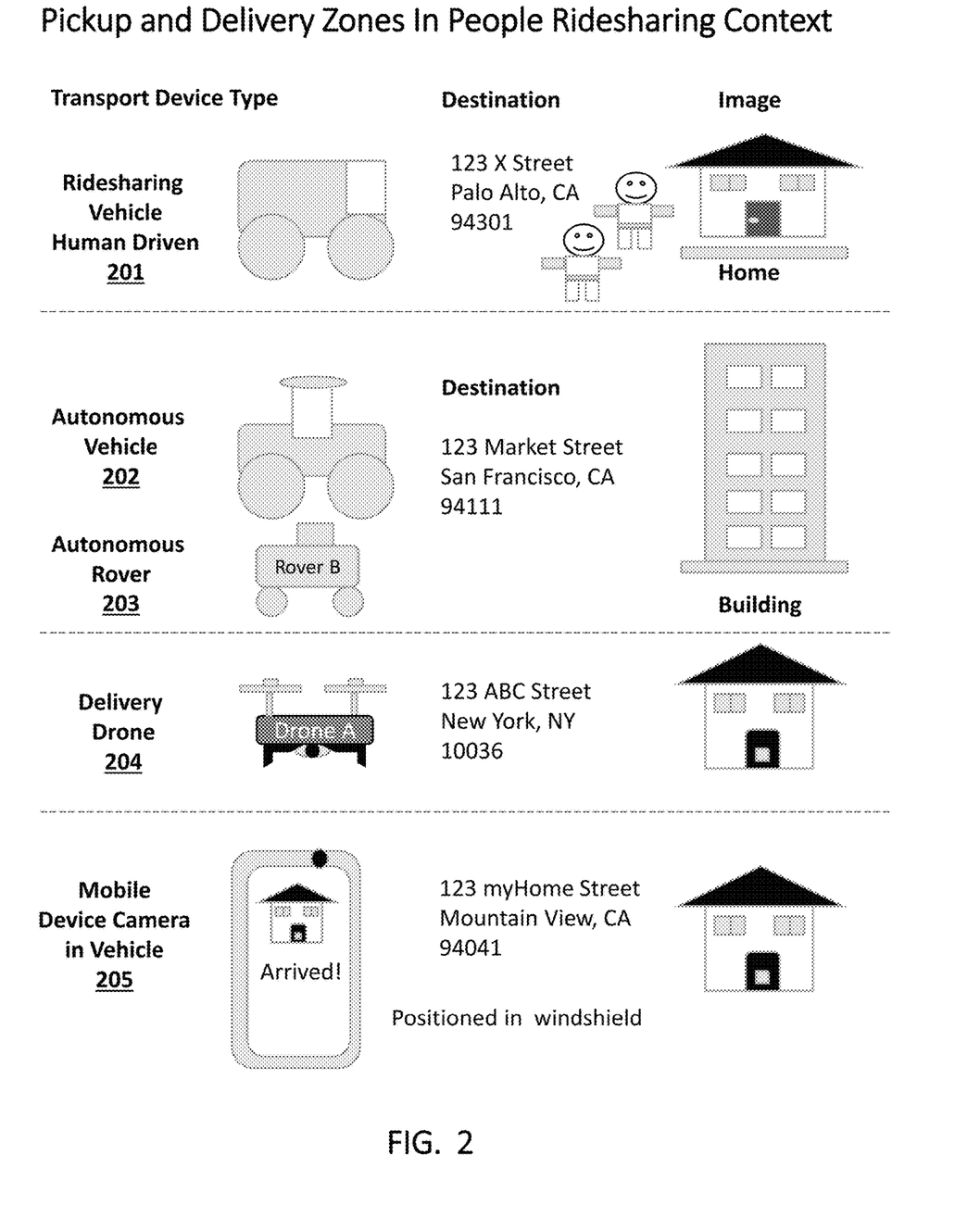
FIG. 2 depicts a plurality of transport devices that are enabled to leverage a pickup and drop off platform.

Referring now to FIG. 2, FIG. 2 depicts various transport devices including vehicles, drones and autonomous devices. Pickup and drop-off zones may be customized based on the type of transport device and the item being transported. For example, a human driven ride sharing vehicle 201 may have PDZ that is on the street. An authorized autonomous vehicle may have a PDZ that is in a driveway such that the autonomous vehicle 202 can wait for extended periods of time without intervention. An autonomous rover 203 which is intended for package delivery may have a pickup and drop off zone that is proximate to the front door, garage, or in a backyard for example.

In some embodiments, a delivery drone 204 may be enabled to deliver a product directly to a PDZ on a tree, on a balcony of a house, the front door, or another location. A mobile device application 205 stored in a non transitory computer readable medium which when executed by a processor of the mobile device may further be used to capture POI data and define rich PDZ profiles. As an example, when the mobile device 205 application such as a ridesharing application may be positioned in the windshield such that at least one camera is enabled to image the front of the vehicle, the street, and one or more objects on the roadway and periphery of the roadway. The camera may be enabled to capture a plurality of images and objects of a roadway to identify that a destination is reached. In certain cases, the application may capture objects on a street that are POIs identified with a neighbor's house to understand how far away the vehicle is away form the PDZ. These images may then be sent to a cloud server for analysis or be analyzed locally by the mobile application.

As a mobile device approaches a certain region, it may download a plurality of localized maps from a mapping server. These localized maps may include GPS coordinate information, geofence information for pick up and drop offs, GPS locations and also images and LIDAR acquired object contours to allow for identification of when the transport device is proximate to location.

Figure 3:
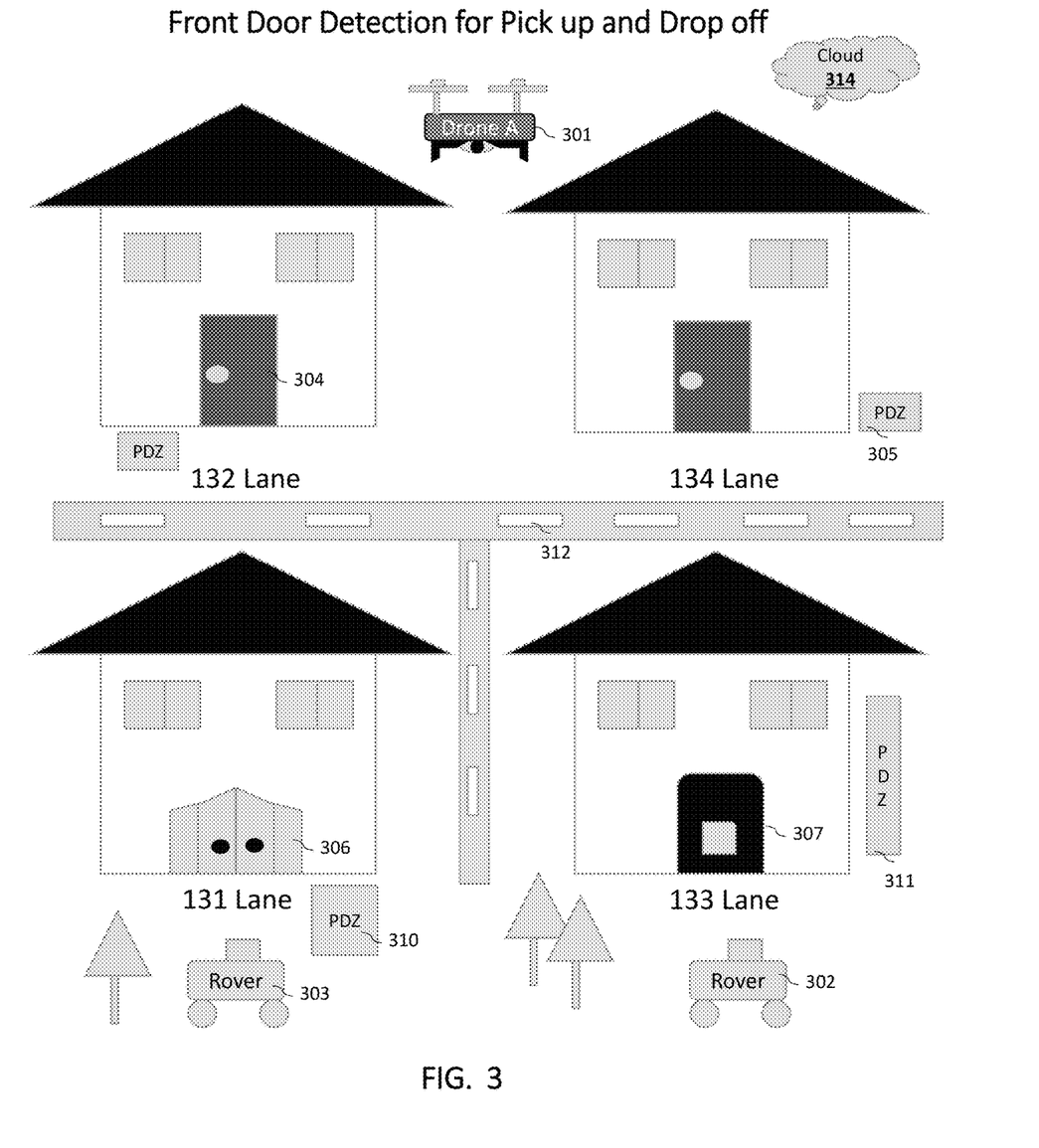
FIG. 3 depicts a plurality of front doors and points of interest on a property that are learned to enable effective pickup and drop off.

Referring now to FIG. 3, FIG. 3 depicts an property detection module to allow for deliveries proximate to one or more identified objects on a property. Various transport devices such as a rover 302, 303 and/or a drone 301 may be enabled to capture images, video, contours, 3D objects, LIDAR object outlines, and transmit the captured items to a cloud based system including one or more servers 314. The transport devices may capture various images on doors for examples of the properties. The doors may differ in style such as those between 304, 306, and 307. The transport devices may identify locations proximate to these doors 304, 306, 307 to be pickup and/or drop off areas such as 305. Various aspects of the doors may be learned such as the color, handle type, contours and so forth. These may be added to a convolutional neural network (CNN) to provide for enhanced learning of the environments.

In some embodiments, the initial capture of the image or contours of objects from LIDAR may be learned over time as part of an unsupervised learning system. As an example, objects may be placed at an address and data around the environment may be captured over time.

Supervised learning may also be used. In other instances, specific training may occur such that the transport device is enabled to leave the package in some areas and ask a user for feedback if the object was placed in an appropriate place. On subsequent visits the transport device may place the package in slight different positions and request feedback data from the user. The feedback data may be a positive indication such as a response to whether the package was placed in an appropriate position, a thumbs up mechanism, a thumbs down, or a rating. As the packages and/or pickups/drop-offs are done in different locations, and based on the subsequent ratings, a geofenced area may be developed for the PDZ.

In certain instances, the location of a delivery or pickup may be unclear or have a low confidence interval associated with it. As an example, townhomes, apartment buildings, and delivery positions that are tightly located next to each other or comprise of an indoor aspect may not have clear GPS positions. In these instances the learning from one or more transport devices to leverage various POIs can provide a better mapping of a location for a PDZ.

Figure 4:
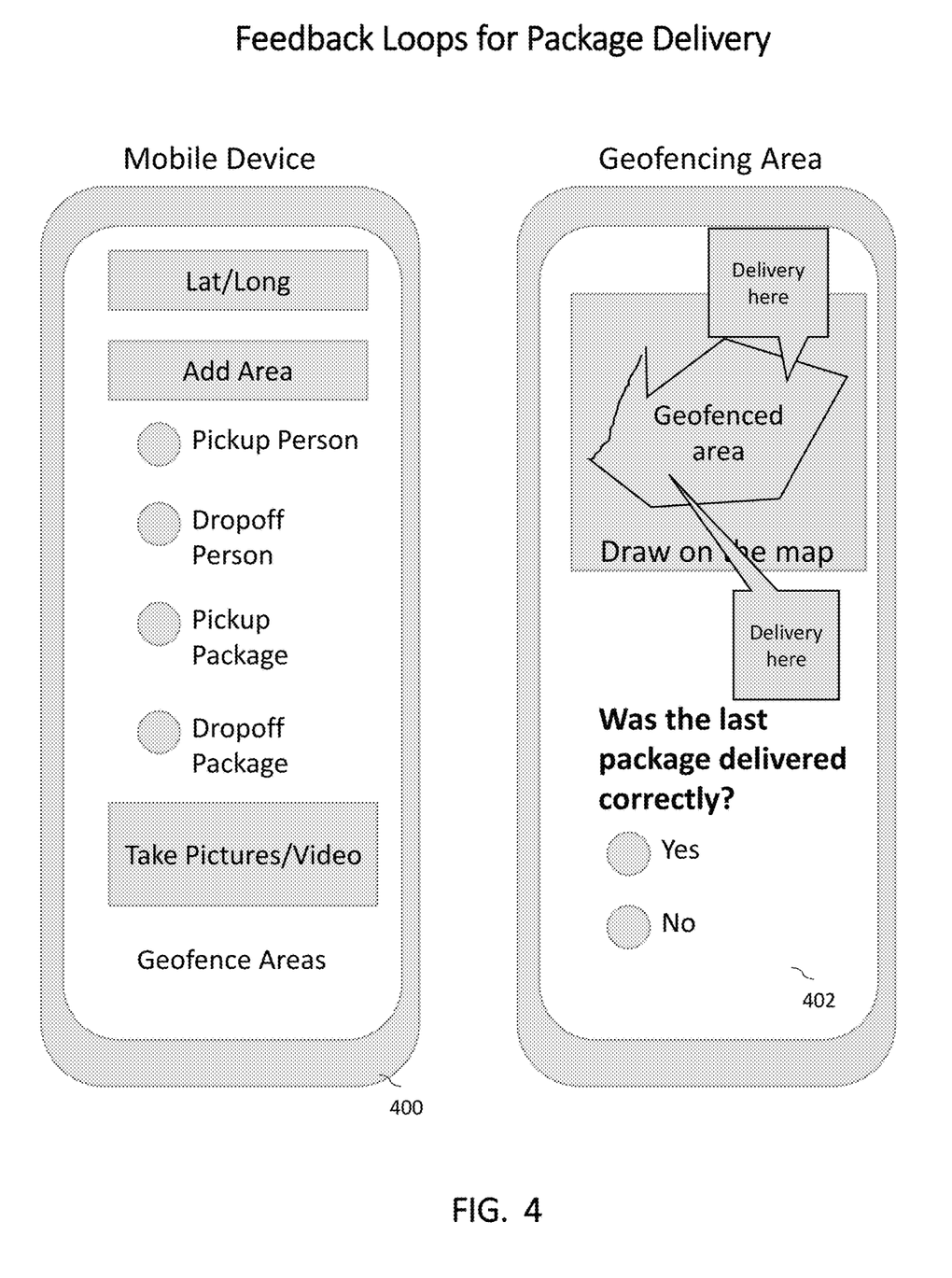
FIG. 4. depicts a mobile application enabled to set up a pickup and drop off location including a geofence area.

Referring now to FIG. 4, FIG. 4 depicts a mobile application 400 stored in a non-transitory computer readable medium executed by one or more processors of a mobile device. The application may provide a user to configure various settings associated with how to receive packages. These settings may include defining for a given location or address different drop off and pick up areas corresponding to different actions such as picking up a person, dropping off a person, picking up a package, and/or dropping off a package. A user may be enabled to take video or one or more images from the application to define a geofenced area for package delivery. A map may be displayed and a user may be enabled to define regions or geofenced regions that are acceptable for various drop offs. A feedback question 402 may be presented to the user to provide learning. The package and/or person pick up location may be specifically captured. In the embodiments of a ridesharing or car pickup, the exact location where the vehicle stopped can be captured. In addition to the GPS location, a visual representation captured by one or more cameras of the vehicle or LIDAR may provide a more accurate location map. In the instance where the pickup was correct, these specific environmental parameters may be stored. Distances between various objects in the image and the location of the vehicle and/or transport device may be captured and subsequently analyzed. In future instances, when the transport device proceeds to the PDZ, these objects can be analyzed with the same distance markers to identify that the device is in the appropriate location.

Figure 5:
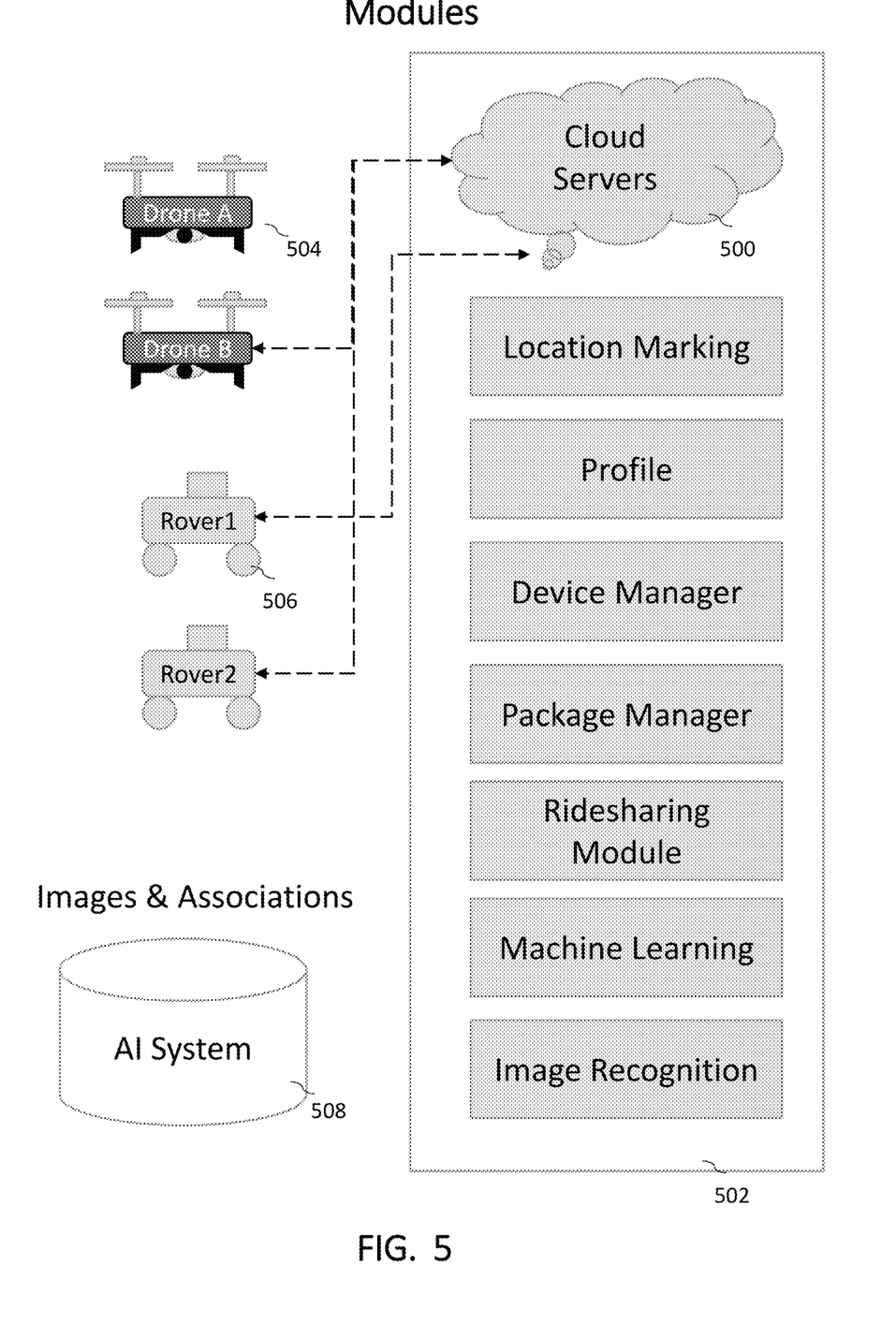
FIG. 5 depicts a plurality of modules for package delivery.

Referring now to FIG. 5, FIG. 5 depicts various modules implemented in software, stored in a non transitory computer readable medium and executed by one or more processors. The modules may be implemented at the transport device and/or at the server. These modules include a location marking module which captures location data such as objects and images in proximate to the pickup and drop off areas. A profile may be created for users of the service such as ridesharing members, package delivery users, and delivery service members. A profile may also be created for various locations such that a PDZ profile exits. These PDZ profiles may include high localized versions of mapping data. The mapping data may include 3D maps, LIDAR detected contours, recognized objects, videos, images, points of interest such as trees and related items. Further, PDZ areas which include geofenced areas may also be present in the PDZ profile.

Figure 6:
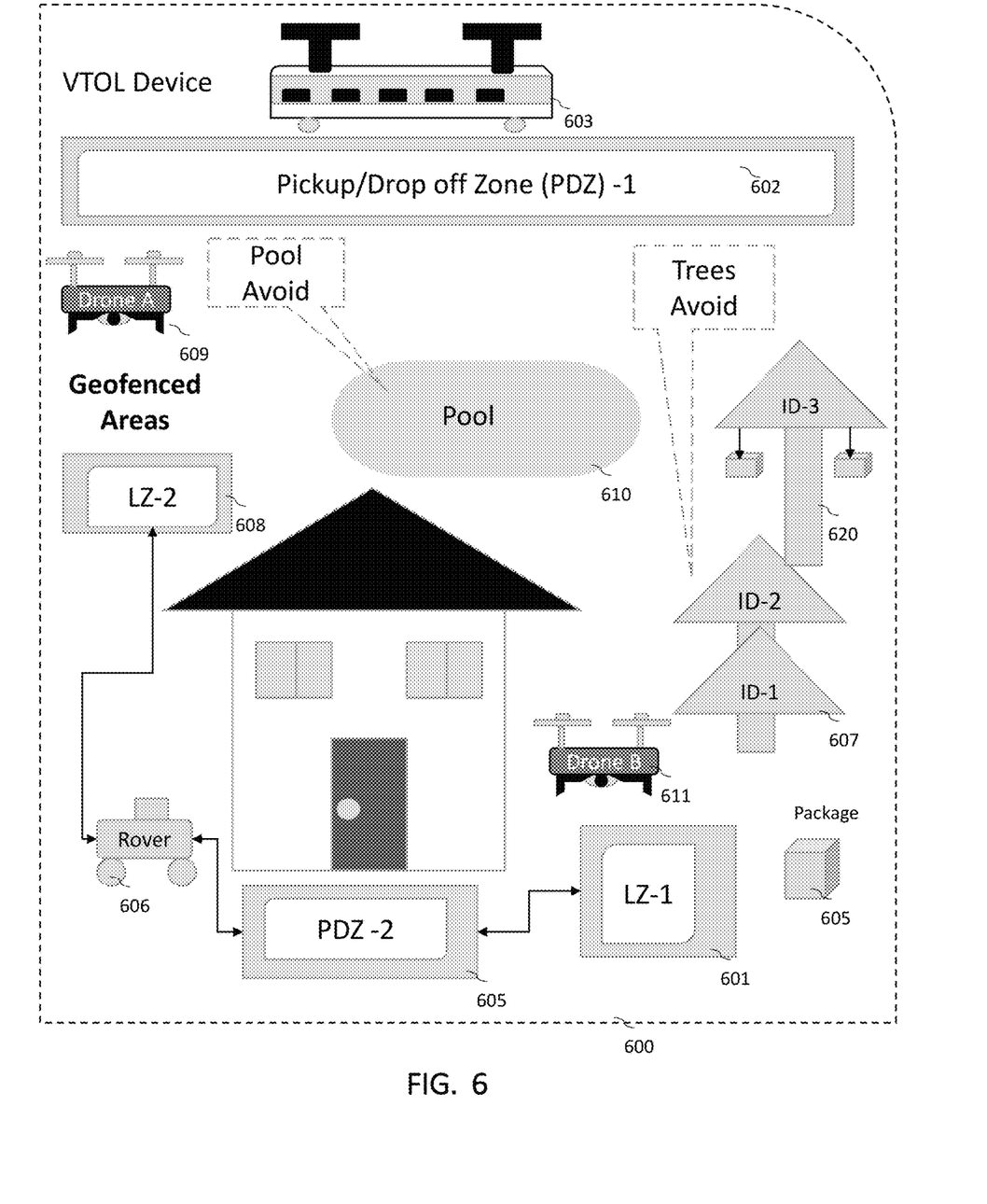
FIG. 6 depicts a property including a plurality of pickup and drop off zones for surface based transport devices and aerial devices.

Still referring to FIG. 5, FIG. 5 further provides for other aspects including a transport device manager, a package manager which includes delivery information for various packages, a ridesharing module which provides information to a Ridesharing service including via an API, a machine learning system which learns areas that were successful and unsuccessful PDZ, and an image and video recognition program which identifies areas Referring now to FIG. 6, FIG. 6 depicts various aspects of a property 600. The property can be imaged by one or more drones 609, 611. The property 600 may be enabled with a plurality of pickup and drop off zones including 602 and 605. Certain drones and VTOL devices may use further other areas including 601. A user may mark items on the property to avoid or to use as POI for determining location relative to an object. As an example, various trees 607 may be identified by one or more transport devices as a place to avoid. Alternatively certain trees may be used to store packages. A drone associated with the property 600 may be enabled to store packages on trees that are enabled with various hooks. Alternatively, certain artificial trees may be installed that include hooks that are associated with various weight ratings to store the packages. The trees 620 can then be a holding device for packages. Other aspects of the property can be geofenced as areas to avoid such as a pool 610.

Figure 7:
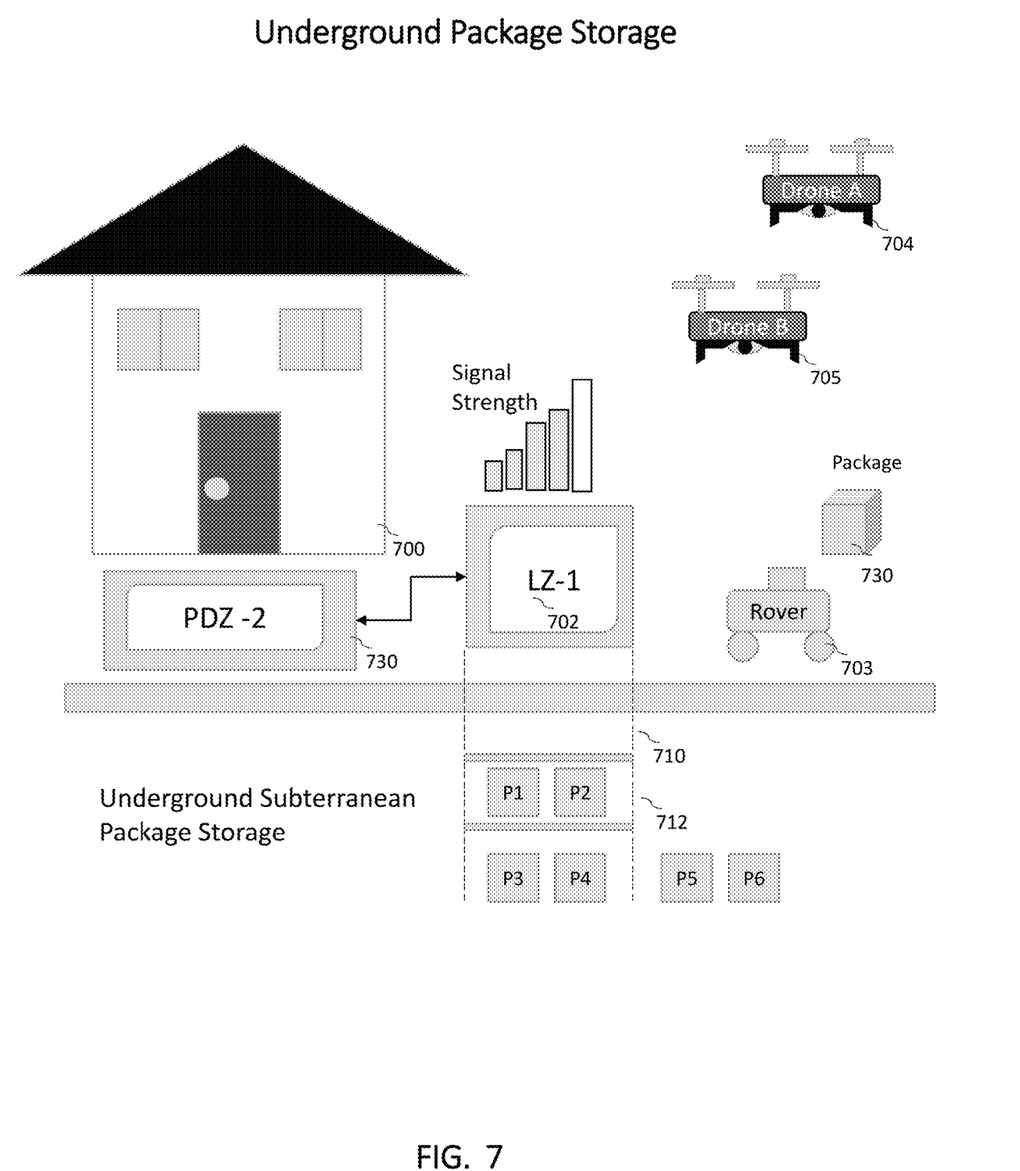
FIG. 7 depicts a delivery system to a location including to a subterranean holding device.

Referring now to FIG. 7, FIG. 7 depicts a property 700 with a subterranean package storage bay 710. The storage bay may be part of an office building, home residence, distribution center, and/or other location. Using this platform various distributed distribution centers may be enabled that are closer in proximity to a neighborhood. Various transport devices including a rover, autonomous vehicle 703, drones 704 and 705, may be enabled for pick up and drop off of packages at a PDZ and/or landing zone 702. A signal strength of a WiFi or other wireless device may be enabled to provide context around the specific location. Packages 730 may be coupled to one or more transport devices. In some embodiments, a surface based device such as the rover may deliver the package and a drone coupled to the property may be enabled to pick up the package 730 and place it into the specific pickup and drop-off areas.

Figure 8:
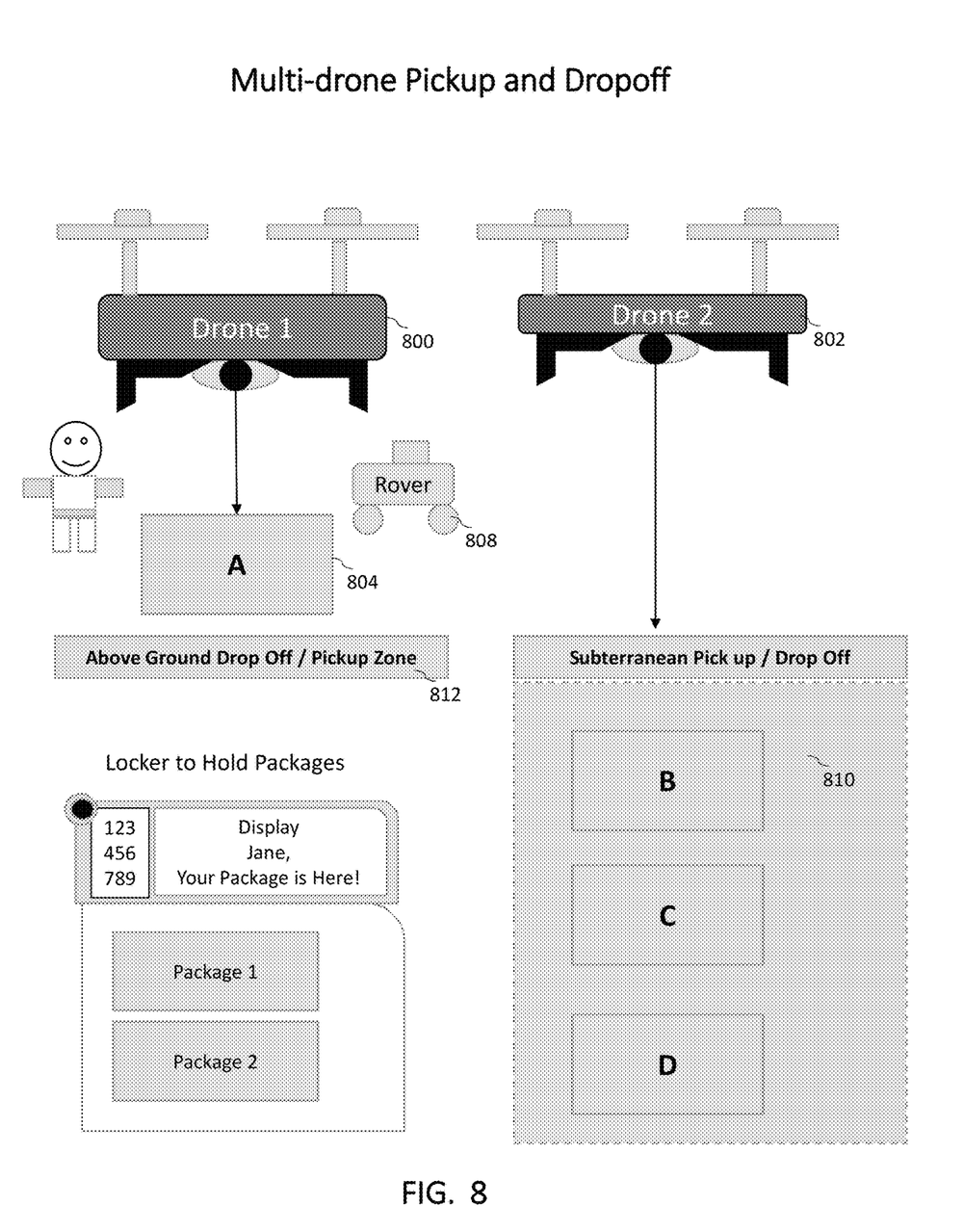
FIG. 8 depicts a delivery drone lowering a package to a plurality of drop off zones including an above ground and below ground location.

Referring now to FIG. 8, FIG. 8 depicts two scenarios in which a package is delivered to the surface at a specified location or geofenced location and a system in which a package is lowered to a place below ground. In the some embodiments, a transport device such as a drone 800 or an autonomous vehicle including a rover 808 is enabled to deliver a package 804 to the appropriate drop off location 812. In some embodiments, a porch of a house may be identified as a place to drop off a package. In some variations, a backyard of a house may be enabled for the underground package storage facility. If the rover 808 is enabled to reach the backyard it may proceed to the point. An above ground storage facility may further be provided and include one or more lockers. In some instances, a house may be enabled with a remote open door system to allow a rover, drone, or other autonomous vehicle to enter a house via one or more doors or windows. A specific code, authentication number, authorization code, may be provided by a server to the remote open system. Upon the delivery drone appropriately authenticating itself to the door or window lock, the house may be entered by the autonomous device.

In some instances, the rover may be enabled to communicate directly to a UAV 802 so that the UAV can take the package from the rover 808. The communication between the rover 808 and the UAV may be peer to peer over one or more wireless protocols including Bluetooth LE, Bluetooth, WiFi, WiFi direct, 802.11ac,x,n,acx, or any other variant. In other instances, the rover 808 may drop the package at a first location and a nearby drone such as drone coupled to the house 802 is enabled to deliver the package to the underground storage facility.

Figure 9:
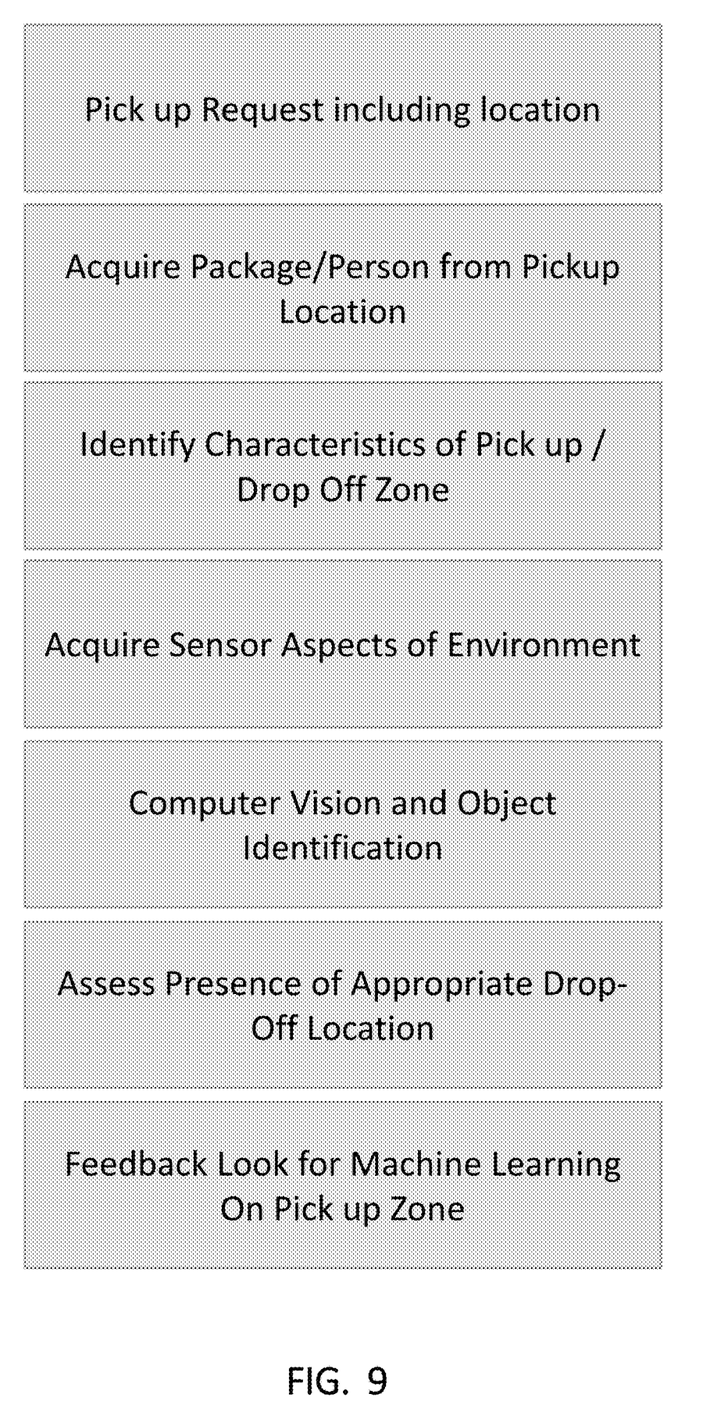
FIG. 9 depicts a plurality of modules of a transport device.

Referring now to FIG. 9, FIG. 9 depicts various modules of an autonomous delivery device. In some embodiments, a transport device is enabled to receive instructions from a server including a pickup request at a specified location. The location may include Lat/Long or another format including a geofenced area. In the case of a package, the transport device is enabled to pickup the package, and upon receiving a successful indication that the package is coupled to the delivery device, it is enabled to request a route to travel from the pickup location to the drop off location. In certain instances, the pickup device will leverage machine vision and perception to understand if the pickup location is correct. In these cases, the transport device will acquire a sensory understanding of the environment including one or more contours and images. The transport device is enabled to use computer vision, an AI learning system, either based on the device and/or a cloud based server to identify and recognize various items along a path. Upon delivering a package to a destination, the device is enabled to create a feedback loop by requesting a response from a user as to whether the package was appropriately delivered to a location.

Figure 10:
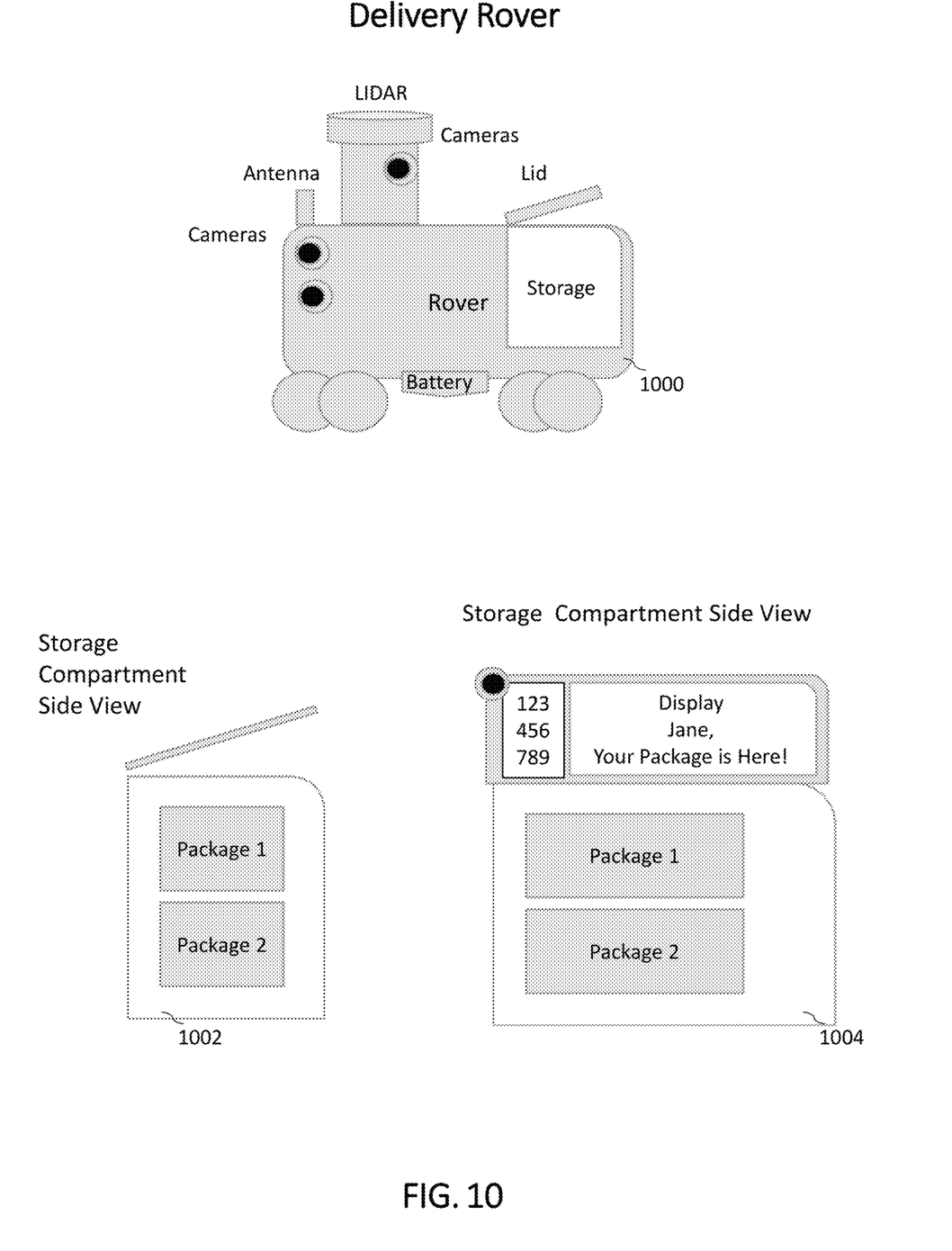
FIG. 10 depicts a rover enabled for package delivery.

Referring now to FIG. 10, FIG. 10 depicts an autonomous vehicle including a rover 1000. The rover is enabled with a storage area, a lid, a battery for an electric charge, a plurality of cameras including digital still and digital video cameras. One or more LIDAR devices may be present on the rover to enable capturing of the environment. In some embodiments, the storage compartment may be heated or cooled in the case of a food delivery.

Still referring to FIG. 10, access to the storage compartment of the rover may be enabled via one or more authentication mechanisms. In some instances, a passcode may be emailed, texted, voice called, or messaged in another form to a user. The passcode may be accessible on one or more devices such as a mobile phone or mobile device. In other instances, a video of the individual accessing the storage compartment may be used to determine access to the device. In some instances, a storage compartment may be fitted with a plurality of compartments to allow for multiple deliveries in one zone.

It is an aspect of the present disclosure to enable the capture of one or more areas proximate to a pickup and drop off zone and the characteristics of that information to be stored in a network accessible memory. One or more servers are enabled to use the characteristics of that information to ensure that an appropriate drop off has occurred.

It is further an aspect of the present disclosure to enable a video recording by a transport device such as a rover, UAV, drone, or self-driving vehicle to ensure that the appropriate delivery of a package occurred.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed is:

1. A system including a transportation device enabled with an autonomous mode comprising:
    a mobile application, stored in a non transitory computer readable medium to be executed by a processor, the mobile application configured to display a map and allow a user to define a plurality of locations on the map, including a pickup or drop-off location and a location for the transportation device to avoid;
    wherein the plurality of locations are communicated to at least one server to be associated with one or more pickup or drop off profiles stored in at least one memory accessible by the at least one server;
    the at least one server enabled to provide instructions for the transportation device to move from a first location to the pickup or drop off location;
    the transportation device enabled to capture at least one image of an area including the pickup or drop off location;
    the transportation device configured to send to the at least one server the at least one image of the area and one or more sensor readings comprising of a Wi-Fi signal, one or more available wireless networks, and/or a LIDAR reading of the area;
    the at least one server configured to add to the one or more pickup or drop off profiles, the at least one image and the one or more sensor readings; and
    wherein the at least one server improves the accuracy of the pickup or drop off location by generating a geofenced area encompassing the pickup or drop off location based on: linking an object in the pickup or drop off location to an estimated distance between the object and a separate object; and utilizing a plurality of user captured feedback as to the accuracy of one or more actual deliveries requested to be at the pickup or drop off location.

2. The system of claim 1, further wherein the at least one transportation device captures a Light Detection and Ranging (LIDAR) data of the drop off area and sends the LIDAR data to the at least one server.

3. The system of claim 2, wherein a GPS location is coupled to the LIDAR data.

4. The system of claim 1, wherein a front door is detected by the at least one server from the at least one image based on one or more constituent elements including a door knob and/or a color.

5. The system of claim 1, wherein the transportation device is a drone and the transportation device is enabled to transfer a package to vehicle and/or a rover.

6. The system of claim 1, wherein the transportation device is a drone.

7. The system of claim 1, wherein the transportation device is a rover.

8. The system of claim 1, wherein the transportation device is a vehicle associated with a ridesharing service.

9. The system of claim 1, wherein the transportation device is an autonomous vehicle.

10. The system of claim 1, comprising: an artificial intelligence software enabled learning module executed by the at least one server to update the drop off location associated to the request based at least in part on the user feedback rating and the one or more aspects within the drop off area.

11. The system of claim 10, wherein an image classification system automatically determines a position of the drop off location relative to one or more aspects as classified within the at least one image.

12. The system of claim 11, wherein the at least one server uses one or more a machine learning neural networks to determine points of interest within the drop off area.

13. The system of claim 1, wherein a user interface of the mobile application is enabled to an input to identify one or more of the plurality of locations as associated with a person pickup, a person drop off, a package pickup, and/or a package drop off.

14. The system of claim 13, wherein the mobile application further comprises of a user feedback rating of the accuracy of the position at which the transportation device stops relative to the drop off zone.

15. The system of claim 1, wherein the pickup or drop off location is associated with a door of a building enabled with a remote open door system to allow the transportation device to enter the building via the door; and wherein authentication to open the remote door system is provided by the at least one server.

16. The system of claim 1, wherein the transportation device is a rover, wherein the rover is enabled to communicate directly to a drone to coordinate the drone to take a package from the rover; and wherein communication between the rover and the drone is based on a wireless peer to peer connection.

17. The system of claim 16, wherein the rover is enabled to drop the package at pickup or drop off location and a drone is enabled to deliver the package to an underground storage facility.

18. The system of claim 17, wherein the rover is enabled with a storage compartment, a lid, a battery, a plurality of cameras including digital still and digital video cameras; and a LIDAR device.

19. The system of claim 18, wherein access to the storage compartment of the rover is enabled based on an authentication mechanism; and wherein the storage compartment comprises of a plurality of sub-compartments to allow for multiple deliveries in one zone.

20. The system of claim 1, wherein the mobile device application comprises of a ridesharing application, wherein at least one camera utilized by the mobile device application is configured to capture in front of the transportation device a street and one or more objects on the street; and wherein the at least one server is enabled to identify that the pickup or drop off location is reached based on recognized items of the one or more objects.

\* \* \* \* \*